US005754096A

United States Patent [19]

Muto et al.

[11] Patent Number: 5,754,096

[45] Date of Patent: May 19, 1998

[54] ELECTRONIC APPARATUS WITH VIBRATION INFORMING FUNCTION

[75] Inventors: Atsushi Muto; Akihiro Iino, both of Chiba, Japan

[73] Assignee: Seiko Instruments Inc., Japan

[21] Appl. No.: 648,568

[22] Filed: May 16, 1996

[51] Int. Cl.[6] .............................. H04B 3/36; G08B 5/22

[52] U.S. Cl. .............................. 340/407.1; 340/311.1; 340/825.44; 340/825.46

[58] Field of Search .............................. 340/407.1, 825.46, 340/825.19, 825.44, 311.1; 434/112, 113, 116; 341/27; 367/116; 379/52

[56] References Cited

U.S. PATENT DOCUMENTS

| | | | |
|---|---|---|---|
| 4,417,246 | 11/1983 | Angor et al. | 340/825.44 |
| 4,975,693 | 12/1990 | Davis et al. | 340/825.44 |
| 5,293,161 | 3/1994 | MacDonald et al. | 340/825.46 |
| 5,304,984 | 4/1994 | Roldan | 340/407.1 |
| 5,436,622 | 7/1995 | Gutman et al. | 340/825.46 |
| 5,488,351 | 1/1996 | Hedayatnia et al. | 340/407.1 |

*Primary Examiner*—Brent A. Swarthout
*Assistant Examiner*—Van T. Trieu
*Attorney, Agent, or Firm*—Adams & Wilks

[57] ABSTRACT

An electronic apparatus with a vibration informing function comprises a vibrating device capable of vibrating for providing information. A reference signal generation circuit outputs a reference signal for producing an operation timing signal. A vibration control device judges whether to vibrate the vibration device and outputs a vibration alarm ON signal in synchronism with the reference signal output by the reference signal generating circuit when it is judged to vibrate the vibration device. A vibrating device control circuit stores predetermined intermittent driving patterns and outputs one of the predetermined intermittent driving patterns in synchronism with the reference signal output by the reference signal generating circuit when the vibration alarm ON signal output by the vibration control device is input thereto. A vibrating device driving circuit outputs a driving signal for vibrating the vibrating device intermittently in response to the predetermined intermittent pattern output by the vibrating device control circuit.

16 Claims, 8 Drawing Sheets

ELECTRONIC APPARATUS WITH VIBRATION INFORMING FUNCTION

BACKGROUND OF THE INVENTION

The present invention relates to an electronic apparatus with a vibration informing function which provides information such as an alarm using a vibrating means such as a vibration motor.

Conventional electronic apparatuses with a vibration alarm include electronic apparatuses with a vibration alarm which continuously vibrates to provide information for an arbitrary period and electronic timepieces with a vibration alarm which has one kind of intermittent vibration pattern and vibrates to provide alarm information in accordance with the vibration pattern.

However, conventional electronic apparatuses with a vibration alarm have had problems as described below.

(1) A vibration alarm which continuously vibrates for an arbitrary period gives a user only a monotonous stimulus. As a result, the user gradually gets used to the stimulus and finally becomes insensitive to the stimulus.

(2) In a vibration alarm which vibrates continuously, a vibration motor is continuously caused to vibrate. This results in extremely high power consumption while the vibration alarm vibrates continuously to provide information. Further, if a battery is used as a power supply to drive the vibration motor, the continuous vibration of the vibration motor gives the battery a very large load. This makes the life of the battery extremely short if information is provided frequently.

(3) The feel of vibration depends on how the electronic apparatus is carried and on the carrier. Therefore, if an electronic apparatus has only one vibration motor driving pattern, the vibration pattern may not be sensed by a user or may be uncomfortable to the user. Further, it is very difficult to set vibration motor driving patterns to accommodate any carrying state.

SUMMARY OF THE INVENTION

It is an object of the invention to provide an electronic apparatus with a vibration informing function which always gives a carrier a sharp stimulus, which is advantageous from the viewpoint of power consumption, and which always provides the optimum vibration regardless of the carrying state and of the carrier.

In order to achieve the above-described object, the present invention employs a configuration of an electronic apparatus with a vibration informing function including: a vibrating means for providing information using vibration; a reference signal generation circuit for outputting a reference signal for producing an internal operation timing signal; a vibration informing control means for storing conditions for providing information, for judging whether to perform vibration informing from the conditions for providing information, and for outputting a vibration alarm ON signal at timing in synchronism with the reference signal output by the reference signal generation circuit if vibration informing is to be provided; a vibrating means control circuit for storing an intermittent driving pattern of the vibrating means and for outputting vibrating means ON/OFF signals according to the intermittent driving pattern at timing in synchronism with the reference signal output by the reference signal generation circuit when the vibration alarm ON signal output by the vibration informing control circuit is input thereto; and a vibrating means driving circuit for outputting a vibrating means driving signal for vibrating the vibrating means intermittently in response to the vibrating means ON/OFF signals output by the vibrating means control circuit.

The basic operation of an electronic apparatus with an informing function having the above-described configuration will now be described with reference to the block diagram in FIG. 1.

In FIG. 1, a reference signal generation circuit 101 outputs a reference signal for producing timing for all operations of the apparatus such as timing for providing information and timing for driving a vibrating means.

A vibration informing control circuit 102 stores conditions for providing information, judges whether to perform vibration informing from the conditions for providing information, and outputs a vibration informing ON signal to a vibrating means control circuit 103 at timing in synchronism with the reference signal output by the reference signal generation circuit 101 if vibration informing is to be performed.

The vibrating means control circuit 103 stores an intermittent driving pattern of a vibrating means 105 and outputs vibrating means ON/OFF signals according to the intermittent driving pattern at timing in synchronism with the reference signal output by the reference signal generation circuit 101 when the vibration informing ON signal output by the vibration informing control circuit 102 is input thereto.

A vibrating means driving circuit 104 vibrates the vibrating means 105 intermittently in response to the vibrating means ON/OFF signals output by the vibrating means control circuit 103, thereby providing predetermined information using the intermittent vibration.

With the above-described configuration, the present invention allows a carrier to be always given a sharp stimulus and is advantageous from the viewpoint of power consumption. Further, the optimum vibration can be always provided regardless of the carrying state and the carrier by preparing a plurality of vibration patterns from which the optimum vibration pattern can be selected.

DETAILED DESCRIPTION OF THE PREFERRED EMBODIMENTS

Embodiments of the present invention will now be described with reference to the drawings.

(1) First Embodiment

Figure 1:
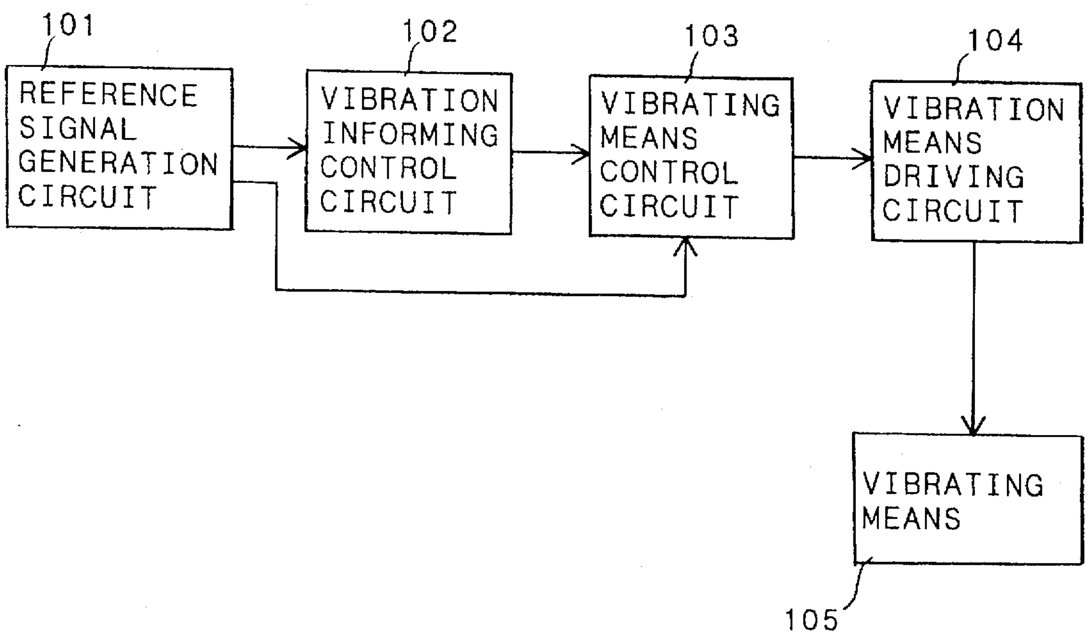
FIG. 1 is a block diagram showing a basic configuration of the present invention.
Figure 2:
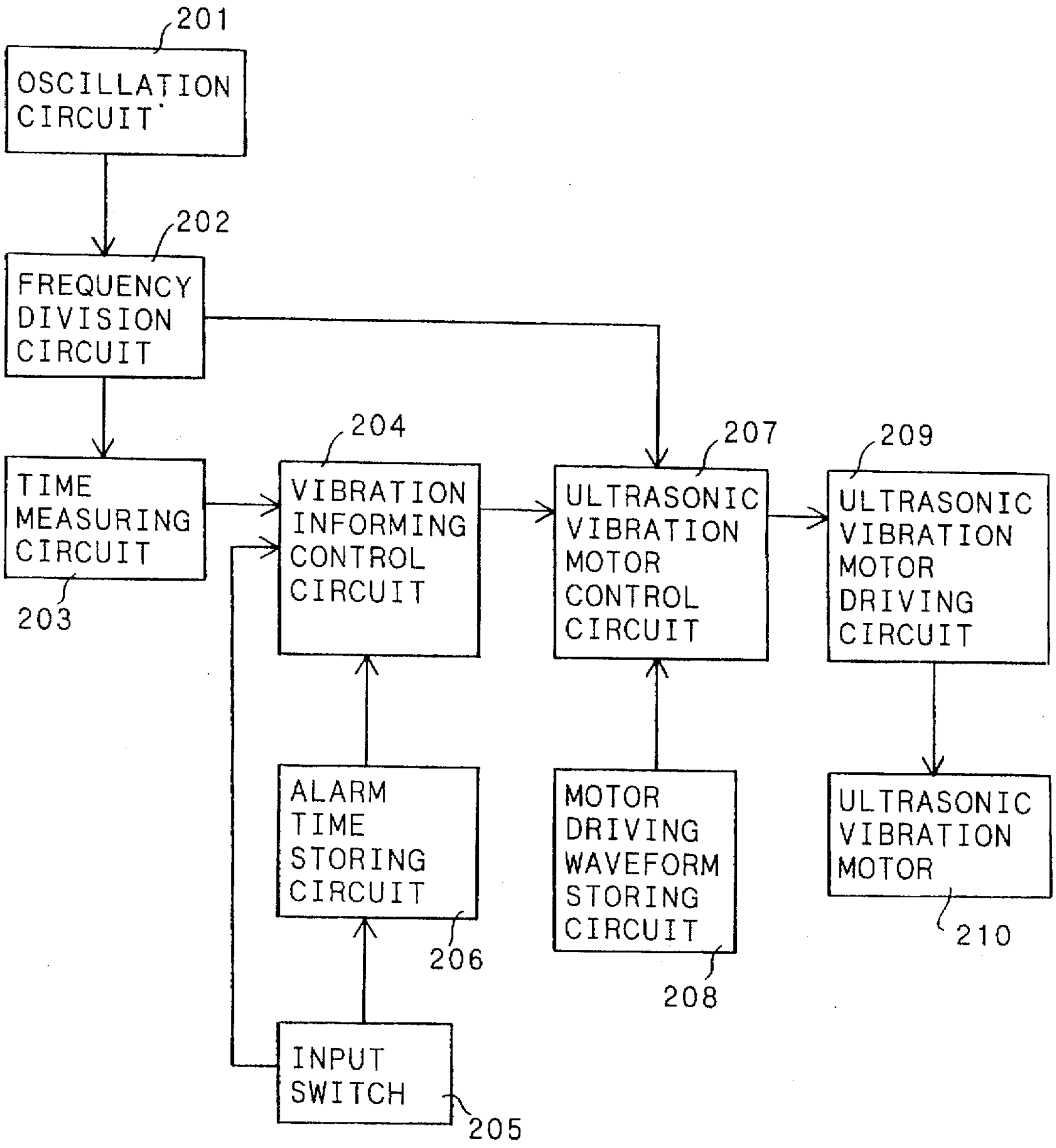
FIG. 2 is a block diagram showing a first embodiment of the present invention.

FIG. 2 is a block diagram showing a first embodiment of the present invention. The present embodiment provides an example of an electronic apparatus with a vibration alarm function which has an external switch for inputting alarm setting time and which uses the vibration of an ultrasonic vibration motor as an informing means, wherein the vibration motor is intermittently driven.

Firstly, the operation in the block diagram of FIG. 2 will be described with reference to the drawings. An oscillation circuit 201 outputs a frequency signal of 32768 Hz which serves as a reference signal for time measurement. The reference signal output by the oscillation circuit 201 is input to a frequency division circuit 202 which provides a base for time counting and other measuring functions such as a stopwatch and a timer. For example, frequency signals of 1 Hz, 8 Hz, 10 Hz, etc. are generated. A time measuring circuit 203 counts the frequency signal generated by the frequency division circuit 202 and generates and stores time data such as seconds, minutes and hours.

Alarm time is set in hours and minutes using an input switch 205, and the set alarm time is stored in an alarm time storing circuit 206. When the set alarm time stored in the alarm time storing circuit 206 agrees with the time data stored in the time measuring circuit 203, a vibration informing control circuit 204 outputs a vibration informing ON signal to an ultrasonic vibration motor control circuit 207.

A motor driving waveform storing circuit 208 stores operation timing for driving and stopping vibration used for the intermittent vibration of an ultrasonic vibration motor 210. When the vibration informing ON signal from the vibration informing control circuit 204 is input, the ultrasonic vibration motor control circuit 207 drives and stops the ultrasonic vibration motor 210 through an ultrasonic vibration motor driving circuit 209 in accordance with a driving pattern for the ultrasonic vibration motor 210 stored in the motor driving waveform storing circuit 208 at timing in synchronism with 8 Hz generated by the frequency division circuit 202. The ultrasonic vibration motor 210 continuously rotates while the ultrasonic vibration motor driving circuit 209 keeps the driving ON.

The vibration pattern of the vibration motor can be arbitrarily set, and the vibration timing can be synchronized with any frequency other than 8 Hz. Further, although the vibration informing control circuit 204 outputs the vibration informing ON signal when the time data stored in the time measuring circuit 203 agrees with the set alarm time data stored in the alarm time storing circuit 206, i.e., when the alarm time is met in the present embodiment, information can be provided using the intermittent vibration of the ultrasonic vibration motor 210 by outputting the vibration informing ON signal not only when the alarm time is met but also in any case where information is to be provided such as when timer count-down remaining time of a timer function becomes 0 (hour): 0 (minute): 0 (second), when the time data becomes the correct time, and when a key input operation is performed on the input switch 205.

The vibration motor used for vibration informing is not limited to an ultrasonic vibration motor, and an electromagnetic motor may be used. Through the above-described operations, this electronic apparatus carries out vibration informing utilizing the intermittent driving of a vibration motor as an informing means.

Figure 3:
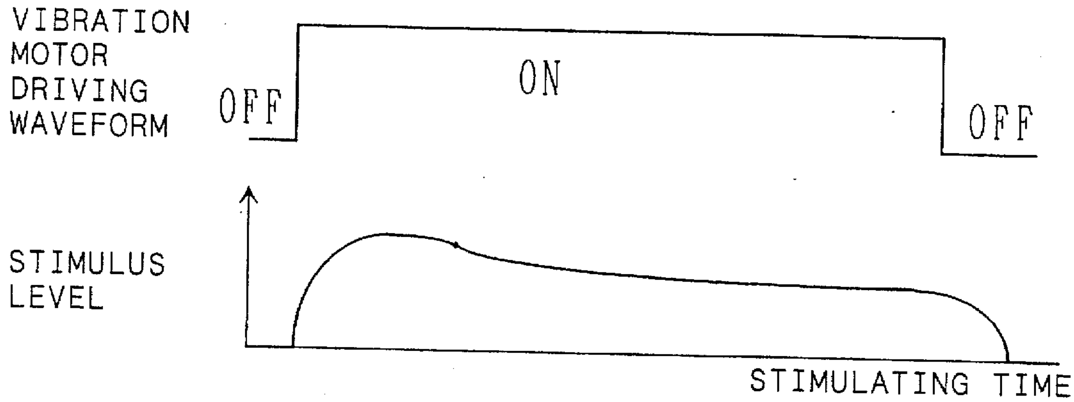
FIG. 3 shows the relationship between a vibration pattern and a stimulus level obtained when a vibration motor is continuously driven.
Figure 4:
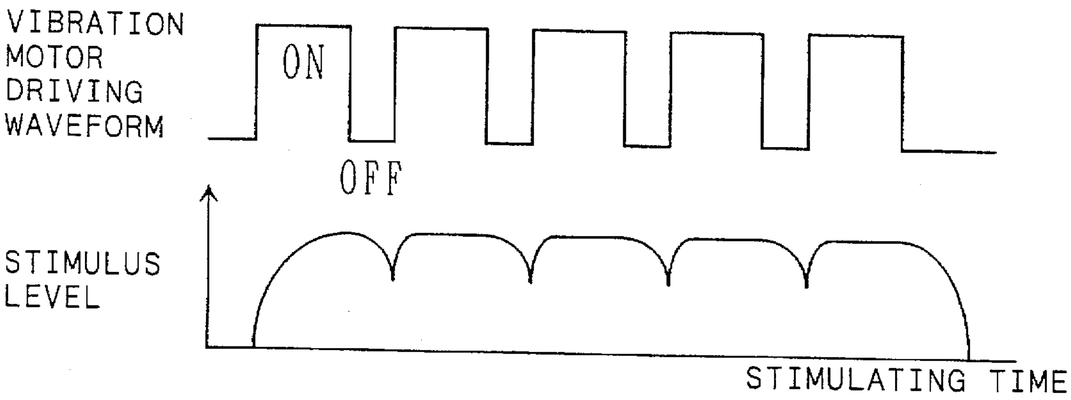
FIG. 4 shows the relationship between a vibration pattern and a stimulus level obtained when the vibration motor is intermittently driven according to the first embodiment of the present invention.

A description will now be provided on the relationship between intermittent vibration patterns and the levels of stimuli applied to the part of the body of a user in contact with the electronic apparatus when the vibration motor vibrates. FIG. 3 shows the relationship between a vibration pattern and a stimulus level obtained when the vibration motor is continuously driven. FIG. 4 shows the relationship between a vibration pattern and a stimulus level obtained when the vibration motor is intermittently driven at ON time-OFF time ratio=2:1. The following advantages can be expected from the intermittent driving of the vibration motor when compared to rotating it continuously.

Firstly, even if the motor driving waveform is in the form of a pulse, the level of a stimulus applied to the contact part by vibration is not attenuated instantaneously, but the stimulus remains for some time like an after-image. Therefore, a continuous stimulus level similar to that obtained by continuously driving the motor can be approximated by causing the motor to vibrate intermittently. Further, when the motor is continuously driven, since the contact part is continuously subjected to a vibration of a constant rotational speed, the contact part gradually gets used to the stimulus and the stimulus level received by the contact part is gradually attenuated. On the other hand, when the motor is driven intermittently, since the rotational speed of the motor varies intermittently to give a strong stimulus intermittently, the stimulus level received by the contact portion can be kept higher than a stimulus continuously received.

Secondly, the intermittent driving of the motor is better than continuous driving in suppressing energy consumption. This is significantly advantageous in expanding the life of a voltage source supplying a limited amount of energy such as a battery used for driving the motor. Further, since a current as high as several tens mA flows across the power supply when the motor is driven, a very large load is applied to the voltage source if the motor is continuously driven. It is therefore very advantageous to drive the motor intermittently also in reducing the load applied to the voltage source. It is apparent from the above that the intermittent driving of a vibration motor is significantly advantageous in maintaining a stimulus level obtained by vibration and reducing energy consumption during the driving of the motor.

(2) Second Embodiment

Figure 5:
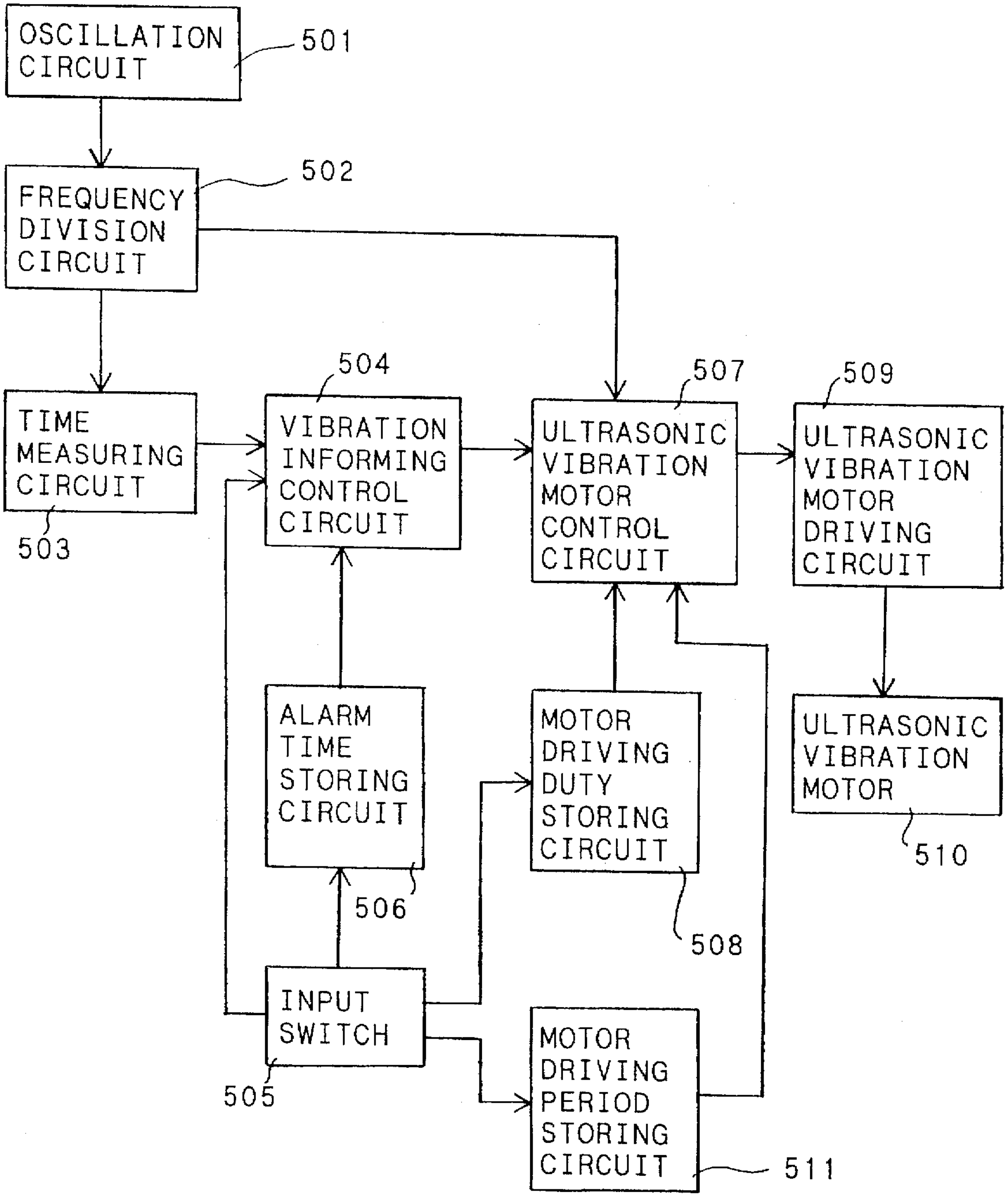
FIG. 5 is a block diagram showing a second embodiment of the present invention.

FIG. 5 is a block diagram showing a second embodiment of the present invention. The present embodiment provides an example of an electronic apparatus with a vibration alarm function which has an external switch for inputting alarm setting time and which uses the vibration of an ultrasonic vibration motor as an informing means, wherein the vibration motor is intermittently driven and wherein the duty and the intermittent period are variable.

Firstly, the operation in the block diagram of FIG. 5 will be described with reference to the drawings. An oscillation circuit 501 outputs a frequency signal of 32768 Hz which serves as a reference signal for time measurement. The reference signal output by the oscillation circuit 501 is input to a frequency division circuit 502 which provides a base for time counting and other measuring functions such as a stopwatch and a timer. For example, frequency signals of 1 Hz, 8 Hz, 10 Hz, etc. are generated. A time measuring circuit 503 counts the frequency signal generated by the frequency division circuit 502 and generates and stores time data such as seconds, minutes and hours.

Alarm time is set in hours and minutes using an input switch 505, and the set alarm time is stored in an alarm time storing circuit 506. When the set alarm time stored in the alarm time storing circuit 506 agrees with the time data stored in the time measuring circuit 503, a vibration informing control circuit 504 outputs a vibration informing ON signal to an ultrasonic vibration motor control circuit 507.

A motor driving duty storing circuit 508 stores a drive ON/OFF duty ratio used for the intermittent driving of an ultrasonic vibration motor 510 while a motor driving period storing circuit 511 stores an intermittent vibration period between a drive ON of the ultrasonic vibration motor 510 and the next drive ON of the same. When the vibration informing ON signal from the vibration informing control circuit 504 is input, the ultrasonic vibration motor control circuit 507 generates a vibration motor driving pattern in accordance with the ON/OFF duty ratio of a driving waveform stored in the motor driving duty storing circuit 508 and the intermittent driving period of the driving waveform stored in the motor driving period storing circuit 511 at timing in synchronism with 8 Hz generated by the frequency division circuit 502. It drives and stops the ultrasonic vibration motor 510 through an ultrasonic vibration motor driving circuit 509 in accordance with the vibration motor driving pattern. The ultrasonic vibration motor 510 continuously rotates while the ultrasonic vibration motor driving circuit 509 keeps the driving ON.

For the driving pattern of the vibration motor, a plurality of ON/OFF duty ratios and intermittent driving periods are arbitrarily prepared in advance, and a user can freely select them using an input switch 505. Further, the synchronization timing is not limited to 8 Hz, and vibration can be performed in synchronism with any frequency.

Further, although the vibration informing control circuit 504 outputs the vibration informing ON signal when the time data stored in the time measuring circuit 503 agrees with the set alarm time data stored in the alarm time storing circuit 506, i.e., when the alarm time is met in the present embodiment, information can be provided using the intermittent vibration of the ultrasonic vibration motor 510 by outputting the vibration informing ON signal not only when the alarm time is met but also in any case where information is to be provided such as when timer count-down remaining time of a timer function becomes 0 (hour): 0 (minute): 0 (second), when the time data becomes the correct time, and when a key input operation is performed on the input switch 505.

Furthermore, the vibration motor used for vibration informing is not limited to an ultrasonic vibration motor, and an electromagnetic motor may be used. The above-described operations allow this electronic apparatus to be provided as an electronic apparatus which carries out vibration informing utilizing the intermittent driving of a vibration motor as an informing means and in which the ON/OFF duty ratio of the intermittent driving pattern and the intermittent driving period can be varied as needed by the user.

Figure 6:
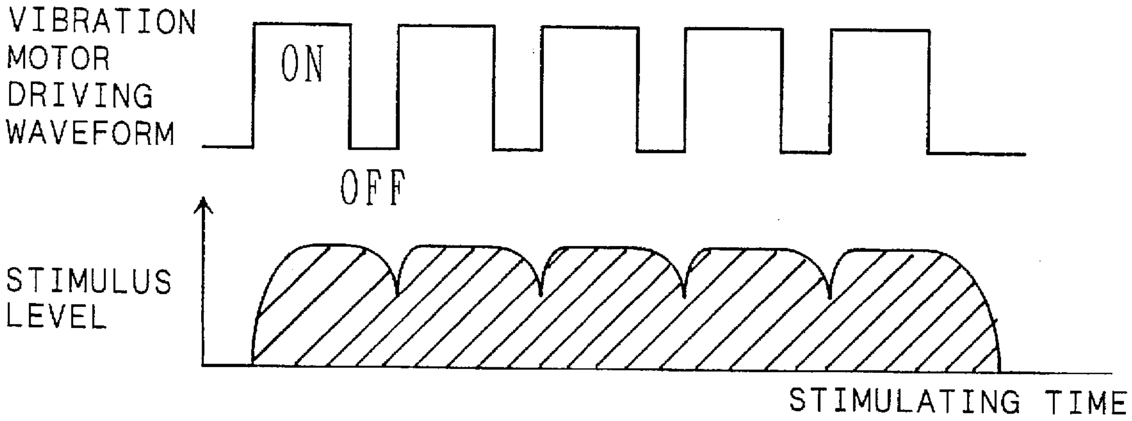
FIG. 6 shows the relationship between a vibration pattern and a stimulus level obtained when the vibration motor is intermittently driven at an ON time-OFF time ratio=2:1 according to the second embodiment of the present invention.
Figure 7:
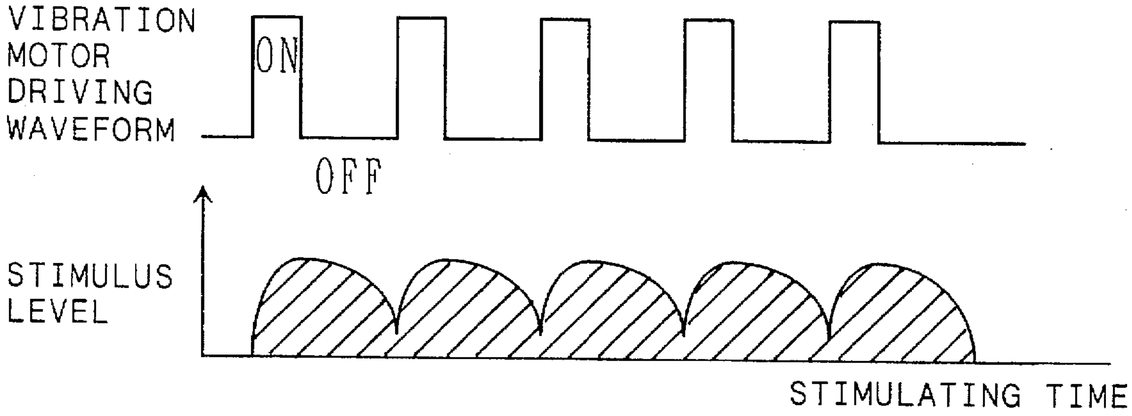
FIG. 7 shows the relationship between a vibration pattern and a stimulus level obtained when the vibration motor is intermittently driven at an ON time-OFF time ratio=1:2 according to the second embodiment of the present invention.

A description will now be made on the relationship between drive ON/OFF duty ratios for intermittent vibration patterns and the levels of stimuli received at the part of the body of a user in contact with the electronic apparatus from vibration. FIG. 6 shows the relationship between a vibration pattern and a stimulus level obtained when the vibration motor is intermittently driven at an ON time-OFF time ratio=2:1. FIG. 7 shows the relationship between a vibration pattern and a stimulus level obtained when the vibration motor is intermittently driven at an ON time-OFF time ratio=1:2.

The capability of varying the drive ON/OFF duty ratio provides the following advantages.

Firstly, the strength of the stimuli can be defined as the magnitude of the areas of the parts indicated by oblique lines in FIG. 6 and FIG. 7. If driving is performed with a constant intermittent driving period, the greater the ratio of the ON time of the drive ON/OFF duty is, the stronger the stimulus becomes. That is, the strength of vibration can be adjusted by varying the drive ON/OFF duty. A stronger stimulus does not necessarily provides a better result. A stimulus given by vibration feels differently depending on the user and how the electronic apparatus is carried. A strong stimulus can be uncomfortable for some people. More comfortable vibration can be provided by preparing a plurality of vibrations having different drive ON/OFF duty ratios in advance to allow a user to select a drive ON/OFF duty ratio, i.e., the strength of vibration which fits him or her depending on time and situation, as in the present embodiment.

Secondly, the capability of varying the drive ON/OFF duty ratio means the capability of varying the drive ON time. From the viewpoint of energy consumption during the driving of a motor, the longer the drive ON time is, the more energy consumed during the driving of the motor. Therefore, energy consumption can be reduced by driving the motor with a drive ON time as short as possible. However, a short drive ON time can result in a risk that the stimulus is too weak to be sensed depending on time and situation. Taking this into consideration, an arrangement is made wherein a drive ON/OFF duty ratio suitable for a normal carrying state is normally set and, when the vibration is difficult to sense, a user can select a drive ON/OFF duty ratio, i.e., the strength of vibration which fits him or her accordingly. This allows a user to obtain vibration more suitable for the environment in which the apparatus is carried and, at the same time, contributes to the reduction of power consumption. As described above, the capability of varying the drive ON/OFF duty ratio of the vibration motor allows a user to obtain more comfortable informing vibration regardless of the environment in which the apparatus is carried and contributes to the reduction of the power consumption of the electronic apparatus.

A description will now be made on the relationship between intermittent drive periods for intermittent vibration patterns and the levels of stimuli received at the part of the body of a user in contact with the electronic apparatus from vibration with reference to FIG. 8, FIG. 9, and FIG. 10. FIG. 9 and FIG. 10 show the relationship between intermittent driving periods which are respectively twice and four times that of the motor driving waveform in FIG. 8 with the drive ON time left unchanged and respective stimulus levels. The capability of varying the intermittent driving period provides the following advantages.

Figure 8:
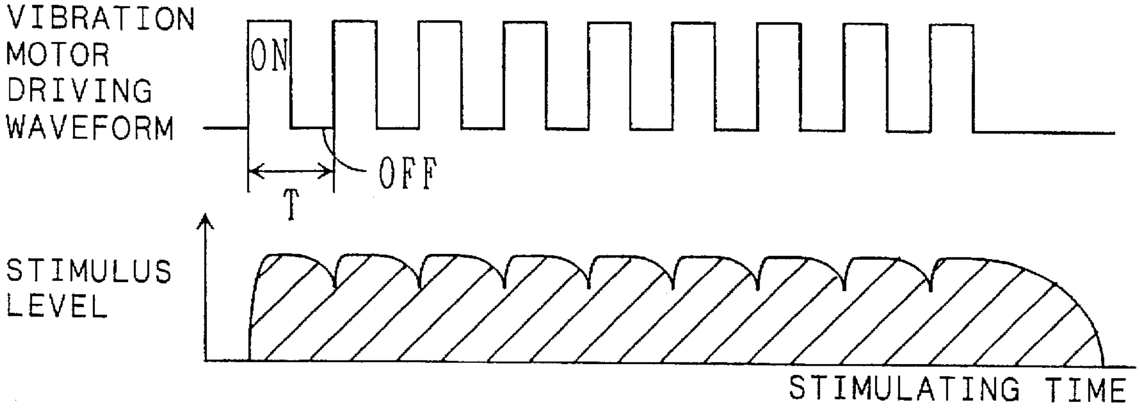
FIG. 8 shows the relationship between an intermittent driving pattern having a period T and the level of a stimulus received at the part of the body of a user in contact with the electronic apparatus from vibration according to the second embodiment of the present invention.
Figure 9:
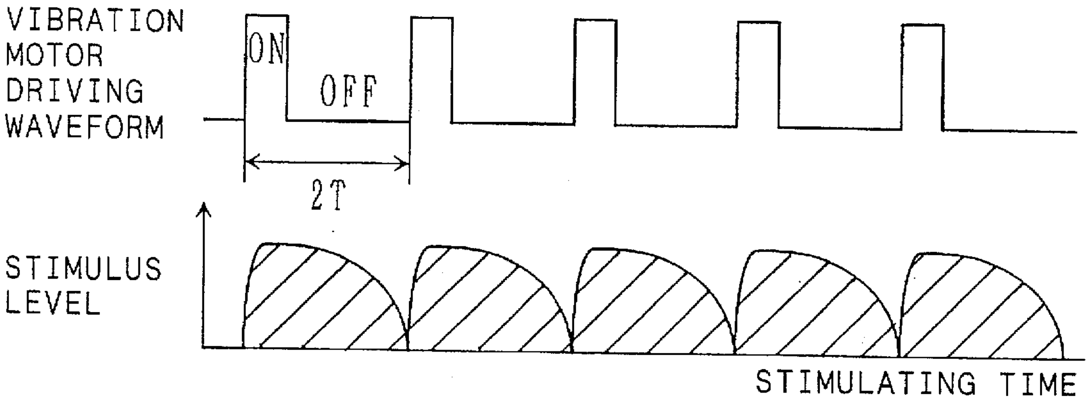
FIG. 9 shows the relationship between an intermittent driving pattern having a period 2 T and the level of a stimulus received at the part of the body of a user in contact with the electronic apparatus from vibration according to the second embodiment of the present invention.
Figure 10:
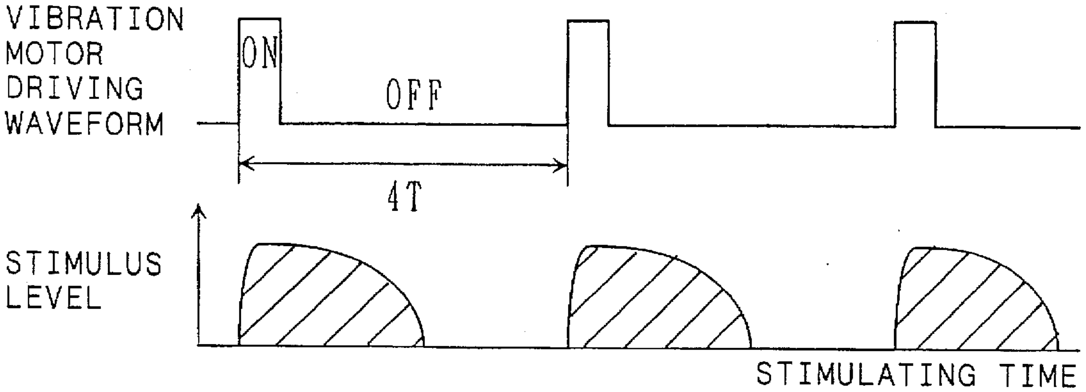
FIG. 10 shows the relationship between an intermittent driving pattern having a period 4 T and the level of a stimulus received at the part of the body of a user in contact with the electronic apparatus from vibration according to the second embodiment of the present invention.

Firstly, the strength of the stimuli can be defined as the magnitude of the areas of the parts indicated by oblique lines in FIG. 8, FIG. 9, and FIG. 10. If the drive ON time of a motor driving waveform is constant, the shorter the intermittent driving time is, the stronger the stimulus per unit time is. That is, if the period of information using vibration is constant, the strength of the vibration can be adjusted by varying the intermittent driving period. Further, although the level of a stimulus is approximated by a continuous stimulus if the intermittent driving period is short, the longer the intermittent driving period is, the clearer the stimulus is. Thus, a more intermittent stimulus is provided. That is, intervals between stimuli can be adjusted by varying the intermittent driving period. A stimulus given by vibration feels differently depending on the user and how the electronic apparatus is carried. An intermittent stimulus can be more comfortable than a continuous stimulus for some people. More comfortable vibration can be provided by preparing a plurality of vibration patterns having different intermittent driving periods in advance to allow a user to select an intermittent driving period for driving, i.e., the strength of vibration which fits him or her depending on time and situation, as in the present embodiment.

Secondly, by making the intermittent driving period somewhat long, intervals are provided between stimuli to allow a user to sensuously count the number of the driving pulses of the motor. This allows a user to feel the communication of information instead of mere information with the skin from the numbers of the output motor driving pulses such as one output pulse meaning "one (1)" and two output pulses meaning "two (2)". Unlike the communication of information using characters and sounds, this allows information to be properly communicated without being hindered by environmental factors such as ambient noises and lightness even to people who are visually and/or aurally handicapped.

Thirdly, the capability of varying the intermittent driving period for driving a motor means the capability of varying the drive ON time. From the viewpoint of energy consumption during the driving of a motor, the longer the drive ON time is, the more energy consumed during the driving of the motor. Therefore, energy consumption can be reduced by driving the motor with a drive ON time as short as possible. However, a short drive ON time can result in a risk that the stimulus is too weak to be sensed depending on time and situation. Taking this into consideration, an arrangement is made wherein an intermittent driving period for driving a motor suitable for a normal carrying state is normally set and, when the vibration is difficult to sense, a user can select an intermittent driving period for driving the motor, i.e., the strength of vibration which fits him or her accordingly. This allows a user to obtain informing vibration more suitable for the environment in which the apparatus is carried and, at the same time, contributes to the reduction of power consumption. In addition, this allows information to be communicated by means of the vibration of a motor.

Figure 11:
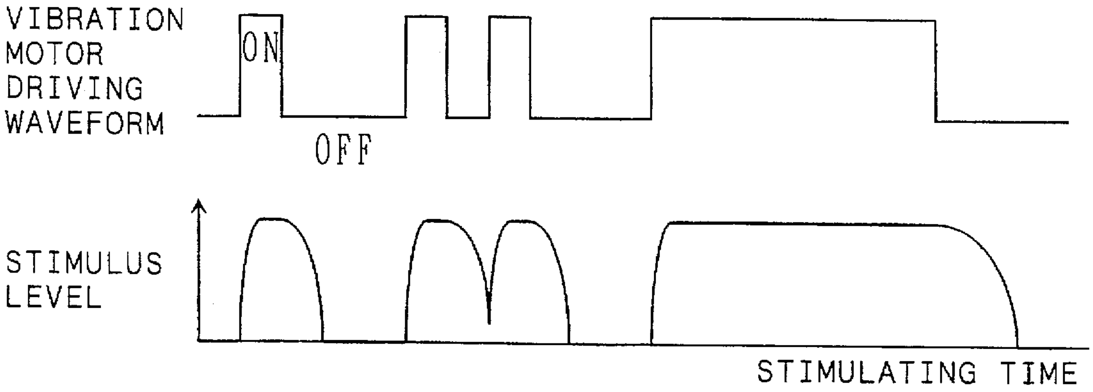
FIG. 11 shows the relationship between a driving waveform of an intermittent driving pattern obtained by combining driving pulses having different intermittent driving periods and motor drive ON/OFF duty and the level of a stimulus received by the part of the body of a user in contact by the electronic apparatus from vibration according to the second embodiment of the present invention.

FIG. 11 shows the relationship between a driving waveform of an intermittent driving pattern obtained by combining driving pulses having different intermittent driving periods and motor drive ON/OFF duty and the level of a stimulus received by the part of the body of a user in contact by the electronic apparatus from vibration. By combining driving pulses having different intermittent driving periods and motor drive ON/OFF duty in driving a vibration motor intermittently, any motor driving pattern can be produced such as a motor driving pattern wherein the stimulus is gradually strengthened as shown in FIG. 11 and a motor driving pattern wherein vibration producing a strong stimulus and vibration producing a weak stimulus are alternately provided. Furthermore, by preparing a plurality of such motor driving patterns in advance so that a user can select vibration by his or her preference or in adaptation to the environment in which the apparatus is carried, an electronic apparatus having more comfortable informing vibration can be provided.

(3) Third Embodiment

Figure 12:
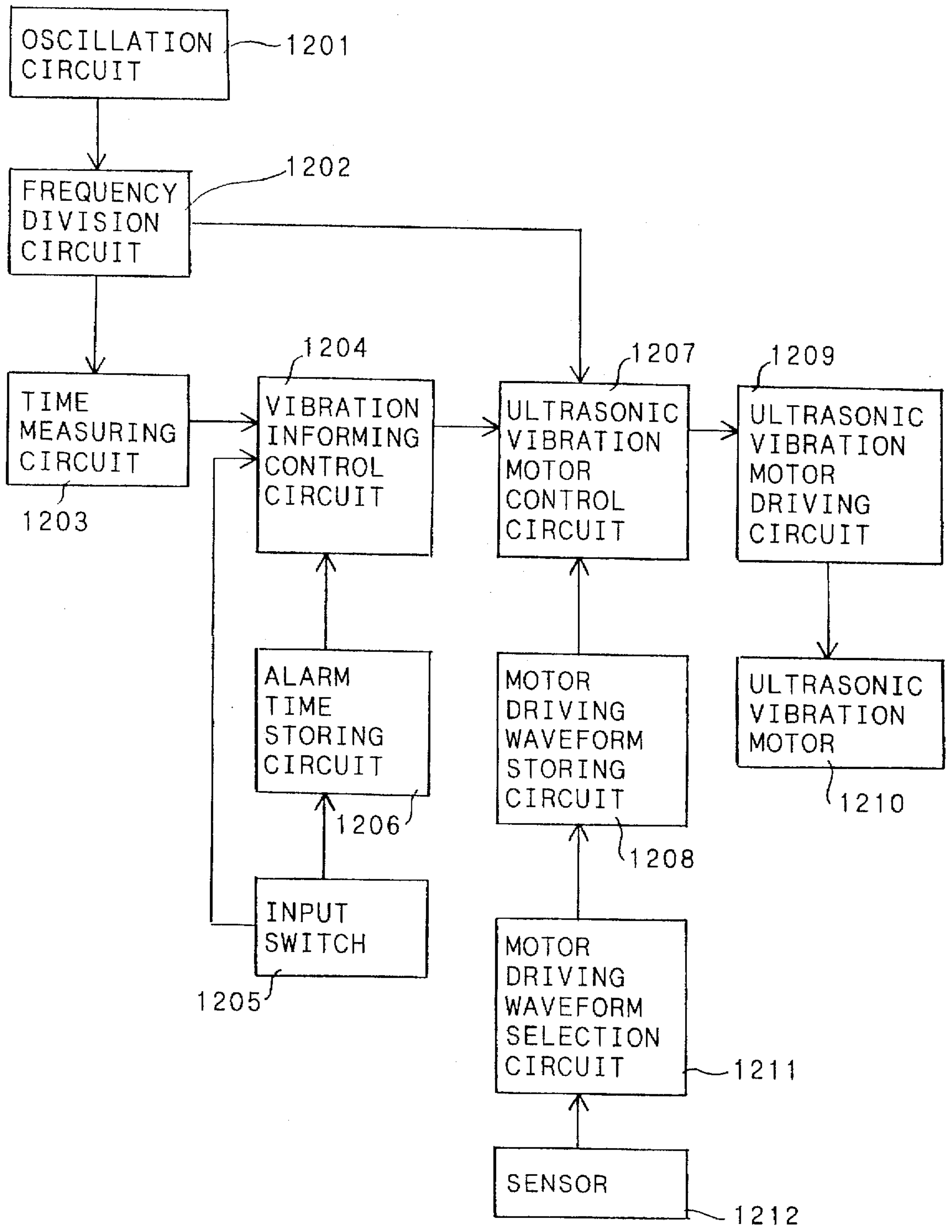
FIG. 12 is a block diagram showing a third embodiment of the present invention.

FIG. 12 is a block diagram showing a third embodiment of the present invention. The present embodiment provides an example of an electronic apparatus with a vibration alarm function which has an external switch for inputting alarm setting time and which uses the vibration of an ultrasonic vibration motor 1210 as an informing means, wherein the carrying state of the electronic apparatus is judged by a sensor to produce and output the optimum vibration motor driving waveform depending on the state.

Firstly, the operation in the block diagram of FIG. 12 will be described with reference to the drawings. An oscillation circuit 1201 outputs a frequency signal of 32768 Hz which serves as a reference signal for time measurement. The reference signal output by the oscillation circuit 1201 is input to a frequency division circuit 1202 which provides a base for time counting and other measuring functions such as a stopwatch and a timer. For example, frequency signals of 1 Hz, 8 Hz, 10 Hz, etc. are generated. A time measuring circuit 1203 counts the frequency signal generated by the frequency division circuit 1202 and generates and stores time data such as seconds, minutes and hours.

Alarm time is set in hours and minutes using an input switch 1205, and the set alarm time is stored in an alarm time storing circuit 1206. When the set alarm time stored in the alarm time storing circuit 1206 agrees with the time data stored in the time measuring circuit 1203, a vibration informing control circuit 1204 outputs a vibration informing ON signal to an ultrasonic vibration motor control circuit 1207.

A motor driving waveform storing circuit 1208 stores three kinds of combination of vibration motor driving patterns having different intermittent driving periods and drive ON/OFF duty ratios of a vibration motor. A sensor 1212 is a pressure sensor which outputs the level of contact between the electronic apparatus and the body of a user in three levels of strength, i.e., "strong", "medium", and "weak". The output signal of the sensor 1212 is input to a motor driving waveform selection circuit 1211 which selects and decides the vibration motor driving pattern corresponding to the level of the contact of the electronic apparatus with the body of the user, i.e., "strong", "medium", or "weak". The sensor 1212 is not limited to a pressure sensor, and other sensors may be used as long as they output information for judging the carrying state of the electronic apparatus. The number of the sensor 1212 is not limited to one, and a combination of a plurality of sensors may be provided. The output level output by the sensor 1212 is not limited to three levels, but the output may be in any number of levels. In addition, a plurality of vibration motor driving patterns may be provided accordingly.

When the vibration informing ON signal from the vibration informing control circuit 1204 is input, the ultrasonic vibration motor control circuit 1207 reads the motor driving pattern selected by the motor driving waveform selection circuit 1211 from the motor driving waveform storing circuit 1208 at timing in synchronism with 8 Hz produced by the frequency division circuit 1202 and drives and stops the ultrasonic vibration motor 1210 through an ultrasonic vibration motor driving circuit 1209 in accordance with the driving pattern. The ultrasonic vibration motor 1210 continuously rotates while the ultrasonic vibration motor driving circuit 1209 keeps the driving ON.

A plurality of driving waveform ON/OFF duty ratios and intermittent driving periods are arbitrarily prepared in advance for a driving pattern of a vibration motor, and a user can select them using an input switch 1205. Further, the synchronization timing is not limited to 8 Hz, and vibration can be performed in synchronism with any frequency.

Further, although the vibration informing control circuit 1204 outputs the vibration informing ON signal when the time data stored in the time measuring circuit 1203 agrees with the set alarm time data stored in the alarm time storing circuit 1206, i.e., when the alarm time is met in the present embodiment, information can be provided using the intermittent vibration of the ultrasonic vibration motor 1210 by outputting the vibration informing ON signal not only when the alarm time is met but also in any case where information is to be provided such as when timer count-down remaining time of a timer function becomes 0 (hour): 0 (minute): 0 (second), when the time data becomes the correct time, and when a key input operation is performed on the input switch 1205. The vibration motor used for vibration informing is not limited to an ultrasonic vibration motor, and an electromagnetic motor may be used. The above-described operations allow this electronic apparatus to be provided as an electronic apparatus which carries out vibration informing utilizing the intermittent driving of a vibration motor as an informing means and in which the vibration motor is driven using a vibration driving pattern suitable for the carrying state.

Figure 13:
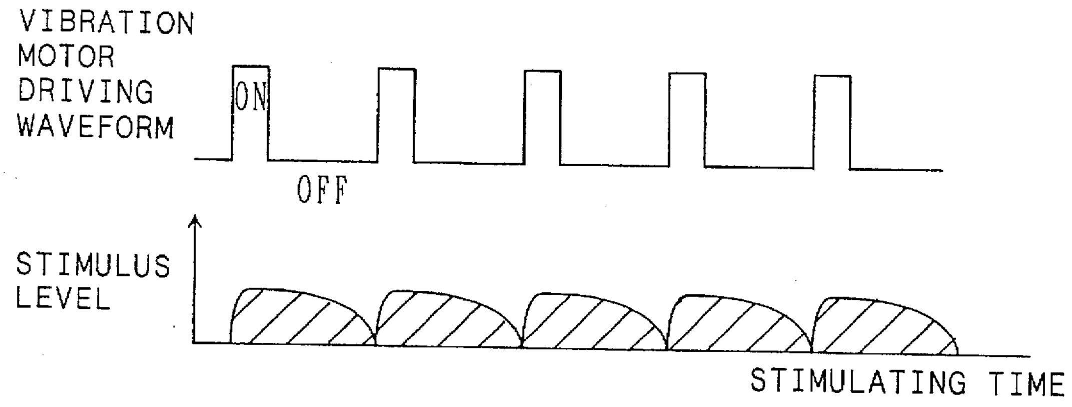
FIG. 13 shows the relationship between a vibration motor driving pattern and the level of a stimulus received at the part of the body of a user in contact with the electronic apparatus from vibration when the level of the output signal of the sensor is "strong", i.e., when the carrying state is very good according to the third embodiment of the present invention.
Figure 14:
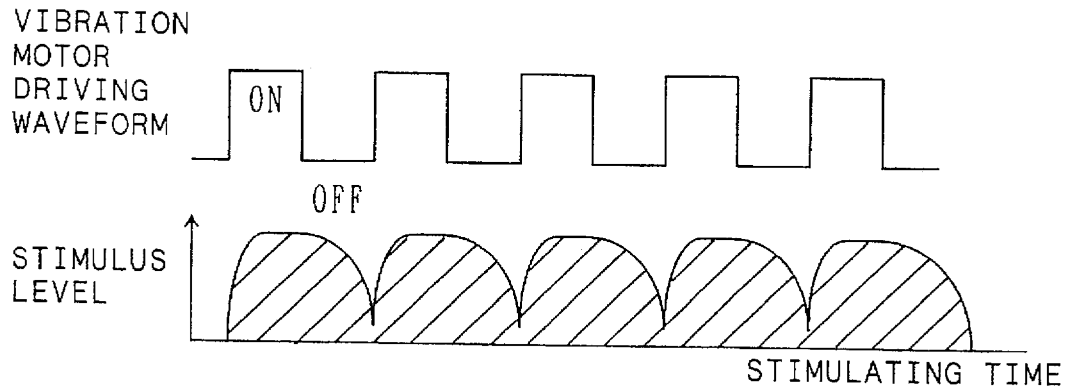
FIG. 14 shows the relationship between a vibration motor driving pattern and the level of a stimulus received at the part of the body of a user in contact with the electronic apparatus from vibration when the level of the output signal of the sensor is "medium", i.e., when the carrying state is normal according to the third embodiment of the present invention.
Figure 15:
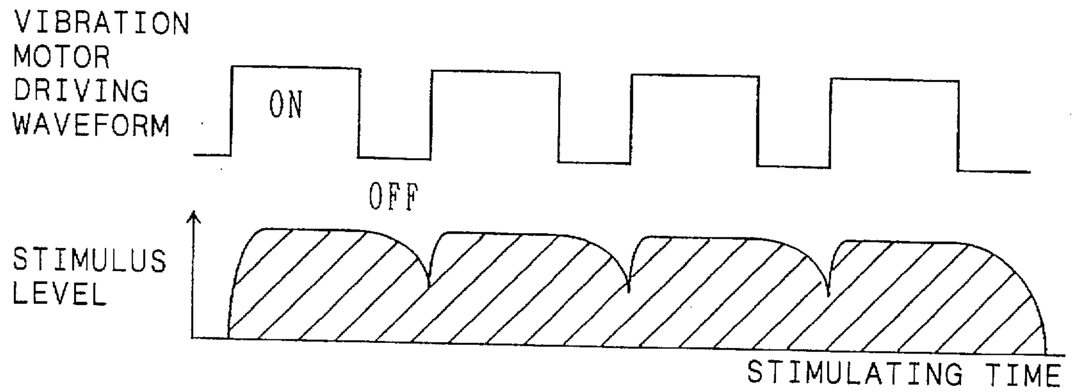
FIG. 15 shows the relationship between a vibration motor driving pattern and the level of a stimulus received at the part of the body of a user in contact with the electronic apparatus from vibration when the level of the output signal of the sensor is "weak", i.e., when the carrying state is bad according to the third embodiment of the present invention.

FIG. 13 shows the relationship between a vibration motor driving pattern and the level of a stimulus received at the part of the body of a user in contact with the electronic apparatus from vibration when the level of the output signal of the sensor 1212 is "strong", i.e., when the carrying state is very good. The level of the stimulus is set slightly lower than the level for normal carrying conditions. FIG. 14 shows the relationship between a vibration motor driving pattern and the level of a stimulus received at the part of the body of a user in contact with the electronic apparatus from vibration when the level of the output signal of the sensor 1212 is "medium", i.e., when the carrying state is normal. The level of the stimulus is set on an assumption that the carrying conditions are normal. FIG. 15 shows the relationship between a vibration motor driving pattern and the level of a stimulus received at the part of the body of a user in contact with the electronic apparatus from vibration when the level of the output signal of the sensor 1212 is "weak", i.e., when the carrying state is bad. The level of the stimulus is set slightly higher than the level for normal carrying conditions. The areas of the parts indicated by oblique lines in FIG. 13, FIG. 14, and FIG. 15 represent the strength of the stimuli. The intermittent driving period and drive ON/OFF duty of the motor driving waveform are varied depending of the conditions under which the electronic apparatus is carried to obtain a motor driving pattern which provides a stronger stimulus as the carrying conditions of the electronic apparatus get worse. This results in advantages as described below.

Firstly, alarm vibration can be reliably transmitted regardless of the carrying conditions of an electronic apparatus.

Secondly, the motor is driven using a motor driving pattern suitable for the carrying conditions of the electronic apparatus, and a motor driving pattern resulting in low power consumption is used if normal carrying conditions are good. Therefore, the highest efficiency can be achieved in terms of power consumption.

Thirdly, the optimum motor driving pattern can be obtained without a user's operations.

As described above, the carrying conditions of an electronic apparatus are measured by a sensor; a motor driving pattern suitable for the carrying conditions is automatically selected in the electronic apparatus; and the motor is driven in accordance with the selected motor driving pattern. It is therefore possible to provide an electronic apparatus with a vibration informing function which always perform the optimum vibration informing regardless of the carrying conditions of the user and which is most efficient in terms of power consumption.

As described above, firstly, the present invention makes it possible to provide a vibration motor driving pattern which always gives a carrier a sharp stimulus and which is advantageous in terms of power consumption by driving a vibration motor using an intermittent driving pattern. Further, a plurality of such motor driving patterns for a vibration motor having different intermittent driving periods and drive ON/OFF duty are prepared to allow the optimum vibration pattern to be selected. As a result, there is provided an electronic apparatus with a vibration informing function which always provides the optimum vibration regardless of the carrying state and the carrier and in which vibration can be used not only as a means for informing but also as a means for communicating information.

What is claimed is:

1. An electronic apparatus with a vibration informing function comprising:

vibrating means for providing information using vibration;

a reference signal generation circuit for outputting a reference signal for producing an operation timing signal;

vibration control means for judging whether to generate vibration and outputting a vibration alarm ON signal at a timing in synchronism with the reference signal output by the reference signal generation circuit if vibration is to be generated;

a vibrating means control circuit for storing a plurality of predetermined intermittent driving patterns and outputting one of the predetermined intermittent driving patterns at a timing in synchronism with the reference signal output by the reference signal generation circuit when the vibration alarm ON signal output by the vibration control means is input thereto; and a vibrating means driving circuit for outputting a driving signal for vibrating the vibrating means intermittently in response to the predetermined intermittent pattern output by the vibrating means control circuit.

2. An electronic apparatus with a vibration informing function according to claim 1; further comprising external setting means for arbitrarily selecting a predetermined intermittent driving pattern to be used for vibration from among the plurality of predetermined intermittent driving patterns stored in the vibrating means control circuit.

3. An electronic apparatus with a vibration informing function according to claim 1; wherein the vibrating means comprises a vibration motor.

4. An electronic apparatus with a vibration informing function according to claim 3; wherein the vibration motor comprises an ultrasonic motor.

5. An electronic apparatus with a vibration informing function according to claim 3; wherein the vibration motor comprises an electromagnetic motor.

6. An electronic apparatus with a vibration informing function according to claim 1; wherein the vibrating means vibrates intermittently to provide information by a pattern of the intermittent vibration.

7. An electronic apparatus comprising:

a vibrator operative when driven to undergo vibration;

a reference signal generation circuit for outputting a reference signal to produce an operation timing signal;

a first vibration control circuit for judging whether to vibrate the vibrator to provide information and outputting a vibration alarm ON signal in synchronism with the reference signal output by the reference signal generation circuit when it is judged to vibrate the vibrator;

a second vibration control circuit for storing at least two different predetermined intermittent driving patterns, receiving the vibration alarm ON signal from the first vibration control circuit, and outputting one of the intermittent driving patterns in synchronism with the reference signal output by the reference signal generation circuit upon receipt of the alarm ON signal from the first vibration control circuit; and a vibrator driving circuit for outputting a driving signal for intermittently vibrating the vibrator in response to the predetermined intermittent pattern output by the second vibration control circuit.

8. An electronic apparatus according to claim 7; further comprising means for arbitrarily selecting one of the predetermined driving patterns output by the second vibration control circuit and applying the selected driving pattern to the vibrator driving circuit.

9. An electronic apparatus according to claim 7; wherein the vibrator comprises a vibrating motor.

10. An electronic apparatus according to claim 9; wherein the vibrating motor comprises an ultrasonic motor.

11. An electronic apparatus according to claim 9; wherein the vibrating motor comprises an electromagnetic motor.

12. An electronic apparatus comprising:

vibrating means for undergoing vibration to transmit information;

reference signal generating means for outputting a reference signal to produce an operation timing signal;

first vibration control means for judging whether to vibrate the vibrating means and outputting a vibration alarm ON signal in synchronism with the reference signal output by the reference signal generating means when it is judged to vibrate the vibrating means;

second vibration control means for storing a plurality of predetermined intermittent driving patterns and outputting a selected one of the predetermined intermittent driving patterns in synchronism with the reference signal output by the reference signal generating means when the vibration alarm ON signal output by the first vibration means is input thereto;

selecting means for selecting the predetermined intermittent driving pattern to be output by the second vibration control means; and driving means for outputting a driving signal for vibrating the vibrating means intermittently in response to the predetermined intermittent driving pattern selected by the selecting means.

13. An electronic apparatus according to claim 12; wherein the driving means includes means for vibrating the vibrating means intermittently to provide information corresponding to the pattern of the intermittent vibration.

14. An electronic apparatus according to claim 12; wherein the vibrating means comprises a vibration motor.

15. An electronic apparatus according to claim 14; wherein the vibration motor comprises an ultrasonic motor.

16. An electronic apparatus according to claim 14; wherein the vibration motor comprises an electromagnetic motor.

* * * * *

UNITED STATES PATENT AND TRADEMARK OFFICE

CERTIFICATE OF CORRECTION

PATENT NO. : 5,754,096
DATED : May 19, 1998
INVENTOR(S) : Atsushi Muto, et al.

It is certified that error appears in the above-identified patent and that said Letters Patent is hereby corrected as shown below:

On the title page, insert the following:

Foreign Application Priority Data

--[30] May 26, 1995 [JP] Japan........................ 7 127935--

Signed and Sealed this

Twentieth Day of July, 1999

Attest:

Q. TODD DICKINSON

Attesting Officer

*Acting Commissioner of Patents and Trademarks*